United States Patent Office 3,242,336
Patented Mar. 22, 1966

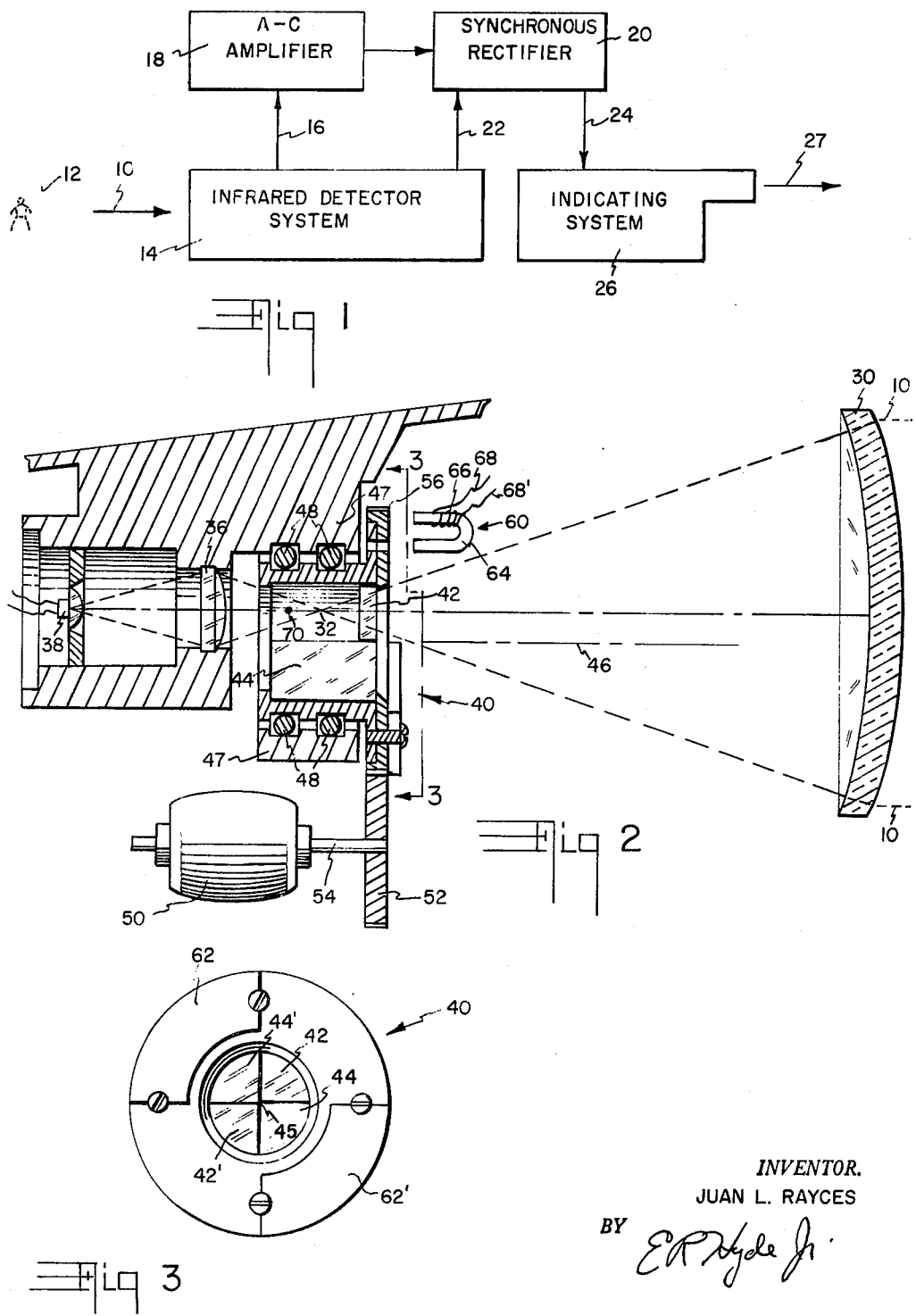

3,242,336
VARIABLE THICKNESS INFRARED CHOPPER TO CHANGE THE FOCUS OF THE OPTICAL SYSTEM
Juan L. Rayces, Westport, Conn., assignor to The Perkin-Elmer Corporation, Norwalk, Conn., a corporation of New York
Filed May 12, 1960, Ser. No. 28,803
6 Claims. (Cl. 250—83.3)

This invention relates to an infrared detector system. In its more specific aspects, the invention comprises a system for detecting an infrared-emitting object which is present in a lower level infrared-emitting background. The system detects such an object by comparing the intensity of the infrared rays reaching a detector from the object with the intensity of the infrared rays reaching the detector from the general vicinity of the object.

To accomplish this result the system employs a novel chopper system for alternately sampling the radiant energy from a relatively small object or part of a field with the average general intensity of the radiant energy level of the background. The rotatable chopper is used to present to the detector alternately a narrow field of view restricted generally to the object and a broad field of view encompassing not only the object but also the vicinity of the object. The difference between the intensity of these two fields of view "seen" by the detector will be a measure of how intense the radiant energy of the object is in comparison with its general background area. Should an energy-emitting object be present in a generally non-emitting environment, the system will detect this difference and thus indicate the presence of such an object. Of course, any difference between the intensity of the object and its background is thus detectable, so that any object which has a higher energy emission than the average intensity of its vicinity can be detected in this manner.

More specifically, the chopper is employed in front of the detector to successively alter the path of non-parallel rays from an object and its vicinity to successively alter the angular relationship of such rays, so that the detector alternately receive a narrow and broad beam of such rays. The chopper itself is formed of different thickness plates of infrared transmitting material. The successive interposition of these different thickness plates in the beam of light coverging on the detector changes the angular relationship of the beam received by the detector so as to cause the detector to "see" alternately a broad and a narrow field of view.

If the detector is placed at the image of the object sought to be detected with the thin plate of the chopper in the system, then substitution of the thick plate of the chopper will defocus the image of the object at the detector, since the change will alter the paths of rays so that they converge at a different point. This will present a blurred image of a larger field, rather than a focused image of the smaller object to the detector. By comparing the signal produced by the detector when the thin plate of the chopper is modifying the convergent beam with the signal produced when the thick plate is modifying the beam, any difference therebetween can be used to indicate the presence of a radiation emitting object.

An object of the invention is therefore to provide an infrared detector system capable of detecting an infrared-emitting object in a field of lesser infrared radiation.

Another object is the provision of a detector system utilizing a novel chopper element for sampling a small and large field of view successively.

A further object is providing a chopper element which is capable upon rotation of varying the angular relationship of a beam of converging radiation so as to vary the point of convergency of the beam.

Further objects of the invention are to provide such a detector system and chopper element which is readily manufactured, easy to use, and adaptable to various uses and conditions.

Other advantages will be obvious to one skilled in the art upon reading the following detailed description of the invention with reference to the accompanying drawing, in which:

FIG. 1 is a diagrammatic showing of the complete detector system showing the general arrangement of the various assemblies.

FIG. 2 is a vertical section through the infrared detecting system showing the detector, chopper, and infrared optical system used therewith.

FIG. 3 is an end elevation of the chopper element, taken on the line 3—3 of FIG. 2.

Referring to FIG. 1 of the drawing, infrared radiation 10 coming from an infrared emitting object 12 enters the infrared optical, chopper, and detector system 14, which will be described in detail hereinafter. The infrared system 14 produces an A.-C. electrical signal 16 which is generally of square-wave in shape, one part of the square wave being proportional to the intensity of the radiation received by the detector from the object and the next part of the square wave representing the intensity of the background or surrounding area radiation reaching the detector in alternate periods of time. The A.-C. component of this signal is amplified by A.-C. amplifier 18 and then fed to synchronous rectifier 20.

The synchronous rectifier 20 also receives a synchronous pulse signal 22 from a rectifier pick-up (hereinafter described), the pulses of which are generated every time a thick plate of the rotating chopper is substituted for a thin plate and vice-versa, as will be later explained. These pulses are utilized in a gating circuit in the synchronous rectifier to synchronously shunt the output of the detector except at such times as the thin and thick plates are being interchanged. The thus modified output of the detector is then rectified and leaves the synchronous rectifier 20 as a D.-C. signal 24. This D.-C. signal is thus proportional to the difference between the radiant energy received by the detector when the thin and thick plates, respectively, are in front of the detector and may operate any type of indicator 26 which produces a sensorily perceptible signal 27.

The operation of the infrared optical, chopper, and detector system is best understood from a consideration of FIG. 2. Objective lens 30 receives radiant energy 10 from the object 12, previously mentioned. The objective lens is of positive power so as to converge parallel rays from a distant object to its focal point. Transfer lens 36 is optically aligned with objective 30 and so positioned that it reimages the image of a distant object onto thermistor detector 38. Both of lenses 30 and 36 are made of material which transmits the type of radiant energy emitted by the object 12 and which has for the type of energy being detected an appropriate index of refraction. For infrared detection, the lenses would be made of an infrared transmitting and refracting material, such as germanium. The surfaces of these lenses and all other surfaces of the various optical elements are coated with a reflection-reducing coating. For germanium optical elements an infrared reflection-reducing coating of zinc sulphide is preferred. The thickness of this coating is preferably chosen to be most effective in reducing reflection of infrared rays of 10 microns in length.

Chopper member 40 is positioned between the objective lens 30 and transfer lens 36. The chopper member is composed of alternating thin plates 42 and thick plates 44 of a material which is transparent to the radiant energy which the system is intended to detect. For infrared object detection, the material used for the plates would be infrared transmitting, for example, germanium. The same thickness coating of zinc sulphide as used on lenses 30 and 36 would also be used on plates 42 and 44 to reduce reflection.

The chopper element 40 itself is best seen in FIG. 3, in which it is shown as a circular disk composed of four plates, 42, 44, 42', and 44'. Each of plates 42 and 42' are relatively thin in comparison to thick plates 44 and 44'. As shown in FIG. 3, the sector-shaped plates are evenly arranged around the center point 45 of the circular disk formed by said plates. It is obvious that the exact shape of each of the plates and of the disk which they form is not critical and different shaped disks composed of different shaped individual plates might be used without departing from the spirit of the novel chopper element disclosed. Similarly, the exact number of alternate thin and thick plates chosen is not critical and any number might be used.

Referring back to FIG. 2, the chopper disk member 40 is rotatably mounted about its center 45 on axis 46. The illustrated means of mounting the disk chopper is by means of a stationary peripheral bearing 47 and ball-bearings 48; but any means for rotatably supporting the disk chopper may be used. The disk chopper is rotated by a D.-C. motor 50 which drives gear 52 through shaft 54. Gear 52 meshes with teeth 56 fixedly mounted about the periphery of chopper disk 40 to thus rotate the chopper. Other motive means may be used, such as an A.-C. motor or the like; and other means for transmitting the motive power to the disk might also be used. For example, instead of using gear 52, a rubber roller might be substituted, therefor, and this could act directly on the periphery of chopper disk 40 without the use of peripheral teeth 56.

The means for producing the synchronous pulse signal 22, previously described, comprises a rectifier pickup 60 and synchronous signal generating means 62, 62', the latter being fixedly secured to the chopper and rotating therewith. These signal generating means may be metal segment-shaped elements extending about the disk chopper the same angular extent as the thick plates 44 and 44'. These metal elements are also peripherally aligned and fixed relative to the thick plates so that they are in the same angular position as the thick plates when the disk chopper is rotating.

The rectifier pickup 60 comprises a stationary magnet 64 surrounded by a coil 66. Since the magnet and coil are in close proximity to the rotating metal synchronous pulse signal elements 62, 62', each time one of the edges of these elements passes the pickup, an electrical pulse is induced in the coil 66. This pulse 22 is then carried by means of wires 68, 68' to the synchronous amplifier 20, previously described.

The chopper member 40 and the optical system operate as follows. When the thin plate 42 or 42' is interposed in the converging beam of radiant energy from objective lens 30, the thin plate affects the converging beam by making the rays thereof converge at a point 32 slightly more remote from the objective 30 than the normal point of convergency (i.e., the point at which the rays would be converged if the thin plate were not present). Thus, a distant object would be focused by objective lens 30 (in the absence of thin plate 42 or 42') at its focal plane, and the presence of thin plate 42 or 42' in the system makes these rays focus at a point slightly more distant from the objective than the focal point. Therefore, a distant object is imaged in a plane slightly to the left (in FIG. 2) of the normal focal plane of objective 30. This "focal point" for the system of lens 10 and thin plate 42 (or 42') is shown in FIG. 2 at 32.

The transfer lens 36 is positioned so as to reimage onto the detector 38 the distant object image at 32 formed by the objective 30 and thin plate 42 (or 42'). To accomplish this, transfer lens 36 is of such power and is so positioned that it has conjugate foci at point 32 and on the surface of the detector 38. In one device actually made, the focal lengths of lenses 30 and 36 and the dimensions of the detector are so chosen, that when the thin plate is in the converging beam, the field of view falling on a square-shaped detector is only 4 x 4 milliradians. This field is measured in space from the front of the objective lens. Thus, an object which subtends this 4 milliradian angle at the objective will be imaged on the detector 38. The parts of the field of view surrounding the object (i.e., the background) will fall outside of the area of the detector and not be picked up thereby.

When the thick plate 44 or 44' is in the converging beam from objective lens 30, the image of a distant object will be shifted by the thick plate to point 70. Since transfer lens 36 has been set to reimage only points at 32 on detector 38, this shift of the image causes transfer lens 36 to produce only a blurred image at 38. Since the image is blurred, the field of view is broadened and in effect averaged. With the previously mentioned 4 x 4 milliradian field sharply focused upon the detector when thin plate 42 or 42' is present, the thick plate 44 or 44' is made sufficiently thick to cause a blurred image of a field of view of 80 x 80 milliradian diameter (measured at the objective as previously explained) to fall upon the detector. Thus as the disk chopper rotates, the detector alternately samples first a sharp, narrow field of view constituting solely the object and then a broader, blurred field of view of the object and its surroundings. If the object emits a greater intensity of radiant energy than the averaged intensity of the object and its surrounding area, there will be induced an A.-C. component in the detector's circuit every time the two fields of view are interchanged (i.e. every time the thick and thin plates are interchanged.)

The chopper is preferably rotated at a speed of about 30 cycles per second when using a four sector chopper, since then about 120 half-cycles of A.-C. signal are produced by the detector. This 60 cycles per second A.-C. signal is readily amplified by the A.-C. amplifier 18 which is preferably fully transistorized. The amplified signal is then used to operate the indicator 26 as previously described.

The operation of the device may be summarized as follows. A radiant energy emitting object is found by angularly moving the whole detector system of FIG. 2 until a perceptible signal is produced by the indicator 26. This will occur when a radiant energy emitting object is generally centered along the optical axis of the detector system. When an object is so located, the rays emanating therefrom will be focused on the detector 38 by objective lens 30 and transfer lens 36 when the thin plate (42 or 42') is interposed in the converging beam from objective lens 30. The detector will then receive essentially all the radiation of the object which enters the objective.

When the thick plate (44 or 44') then replaces the thin plate, the image of the distant object, formed by the objective, will move back from point 32 toward lens 36 to point 70. The focal length and placement of transfer lens 36 have been chosen so that the lens reimages only images at point 32 sharply on the detector 38. Since the object is imaged by objective lens 30 and thick plate (44 or 44') at a point closer to lens 36 than point 32, only a blurred image of the object and its vicinity is formed in the plane of the detector 38. All of the rays from the object entering objective lens 30 no longer are converged onto the detector, but some of the rays from the area surrounding the object now do impinge upon the detector. This effects an averaging of the object and surrounding area intensities. If the object emits more energy than the same area of its background, this average will be low than the thin plate condition described above where all of the energy reaching the objective 30 from the object impinges upon the detector 38.

Thus when an energy-emitting object lies generally on the optical axis of the system, more radiation reaches the detector 38 when the object is focused on the detector (i.e. when the thin plate of the chopper is operative) than when the object and its surrounding area are blurredly received by the detector (i.e. when the thick plate of the chopper is operative).

The A.-C. signal produced by this alternating high and low level of radiation "seen" by the detector is then amplified as previously described and may operate either a quantitative or qualitative indicator 26. This indicator may be a glow tube, a meter, a bell or any other sensorily perceptible signal. By providing the A.-C. amplifier 18 with a variable gain control, the sensitivity of the system may be controlled.

An infrared detection system according to the above disclosure has been made which can detect an object which is only 0.3° C. higher in temperature than its surrounding area. In this system the equivalent focal length of the system with the thin plate in the beam is four inches and the relative aperture is $f/2$.

Although the particular embodiment disclosed is specifically adapted for detecting an infrared emitting object, it is obvious that the same system may be used for other types of radiation, such as ultra-violet or even visible light. All that is required is that the materials of the lenses and chopper plates be made of material which will transmit (and refract in air) the type of radiation for which the device is designed to be used.

Although a specific embodiment of the invention has been disclosed as required by the patent statute, it is obvious that certain changes may be made without departing from the spirit of invention. The invention is, therefore, not restricted to the disclosed embodiment but is defined by the following claims and their equivalents.

I claim:

1. An infrared chopper disk adapted to be rotated about its axis to differentially alter non-parallel infrared rays, comprising
    two sector-shaped plane plates of a first uniform thickness arranged diametrically opposite to ecah other with respect to the axis of said chopper disk;
    two sector-shaped plane plates of a second uniform thickness substantially different from said first thickness and being arranged diametrically opposite to each other with respect to said chopper disk axis;
    each of said sector-shaped plates being shaped substantially as a quadrant of a circle;
    each of said plates being composed of germanium so as to transmit infrared radiation;
    each of said plane surfaces of said plates being coated with zinc sulphide to reduce reflection losses in the infrared part of the spectrum.

2. An infrared object detector system, comprising
    a lens of infrared refracting material and of positive power so as to converge infrared rays emanating from a distanct object;
    a rotatable disk chopper member positioned generally on the optical axis of said lens and on the side thereof remote from the object;
    said disk chopper member being rotatably mounted about a pivot axis substantially at its geometric center with said axis being substantially parallel to the optical axis of said lens but offset therefrom a distance equal to less than the radius of said disk chopper member;
    means for rotating said disk chopper member about said pivot axis;
    said chopper member comprising at least two, substantially plane parallel plates of infrared refracting material arranged about said pivot axis;
    said plates being of substantially different thickness so as to cause the rays from said distant object to converge at a first image plane when the thinner plate is in the convergent radiation and at a second image plane when the thicker plate is in the convergent radiation;
    an infrared detector means substantially on the optical axis of said lens and on the side of said chopper member remote from said lens;
    said detector means being effectively positioned in one of said image planes so as alternatively to receive an in-focus and out-of-focus image of said distant object when the different plates are in said convergent radiation;
    and means for producing a sensorily perceptible signal when the intensity of the total radiation reaching said detector when one of said plates is in said convergent radiation differs by a substantial amount from the intensity of the total radiation reaching said detector when the other different thickness plate is in said convergent radiation;
    said sensorily preceptible signal therefore being produced when said distant object emits infrared radiation having a different intensity level from the infrared radiation emission level of the vicinity of said object.

3. An infrared object detector system, comprising
    an objective lens of infrared refracting material and of positive power so as to converge infrared rays emanating from a distant object;
    a rotatable disk chopper member positioned generally on the optical axis of said objective lens and on the side thereof remote from the object;
    said disk chopper member being rotatably mounted about a pivot axis substantially at its geometric center with said axis being substantially parallel to the optical axis of said objective lens but offset therefrom a distance equal to less than the radius of said disk chopper member;
    means for rotating said disk chopper member about said pivot axis;
    said chopper member comprising at least two, substantially plane parallel plates of infrared refracting material arranged about said pivot axis;
    said plates being of substantially different thickness so as to cause the rays from said distant object to converge at a first image plane when the thinner plate is in the convergent radiation and at a second image plane when the thicker plate is in the convergent radiation;
    an infrared detector means substantially on the optical axis of said lens and on the side of said chopper member remote from said objective lens;
    a transfer lens positioned between said detector means and said chopper member;
    said detector and said transfer lens being so positioned for the particular optical power of said transfer lens that an image formed at one of said image planes will be reimaged onto said detector;
    and means for producing a sensorily perceptible signal when the intensity of the total radiation reaching said detector when one of said plates is in said convergent radiation differs by a substantial amount from the intensity of the total radiation reaching said detector when the other different thickness plate is in said convergent radiation;
    said sensorily perceptible signal therefore being produced when said distant object emits infrared radiation having a different intensity level from the infrared radiation emission level of the vicinity of said object.

4. An infrared object detector system, comprising
    a lens of infrared refracting material and of positive power so as to converge infrared rays emanating from a distant object;
    a rotatable disk chopper member positioned generally on the optical axis of said lens and on the side thereof remote from the object;

said disk chopper member being rotatably mounted about a pivot axis substantially at its geometric center with said axis being substantially parallel to the optical axis of said lens but offset therefrom a distance equal to less than the radius of said disk chopper member;

means for rotating said disk chopper member about said pivot axis;

said chopper member comprising at least two, substantially plane parallel plates of infrared refracting material arranged about said pivot axis;

said plates being of substantially different thickness so as to cause the rays from said distant object to converge at a first image plane when the thinner plate is in the convergent radiation and at a second image plane when the thicker plate is in the convergent radiation;

an infrared detector means substantially on the optical axis of said lens and on the side of said chopper member remote from said objective lens;

said detector means being effectively positioned in one of said image planes so as alternatively to receive an in-focus and out-of-focus image of said distant object when the different plates are in said convergent radiation;

electric circuit means operatively connected to said detector means for producing a substantial output signal if the intensity of the total radiation reaching said detector when one of said plates is in said convergent radiation differs by a substantial amount from the intensity of the total radiation reaching said detector when the other different thickness plate is in said convergent radiation;

and an indicator means connected to said electric circuit means for producing a sensorily perceptible signal when said electric circuit produces said substantial output signal;

said sensorily perceptible signal therefore being produced when said distant object emits infrared radiation of a substantially different intensity level from the infrared radiation emission level of the vicinity of said object.

5. An infrared object detection system according to claim 4 in which said electric circuit means comprises means for causing said output signal to be proportional to the difference in the intensity of the total radiation reaching said detector when the thinner and thicker plates respectively are interposed in said convergent radiation;

said indicator means being quantitatively responsive to said output signal in a proportional manner;

so that said indicator produces a sensorily perceptible signal proportional to said difference in the intensity of the radiation reaching said detector when said different thickness plates are interposed, respectively;

whereby a quantitative indication is obtained of the intensity of the infrared radiation emitted by said distant object relative to the infrared radiation intensity level of the vicinity of said object.

6. An infrared object detector system, comprising a lens of infrared refracting material and of positive dioptric power so as to converge infrared rays emanating from a distant object to form an image;

means for cyclically varying the effective converging dioptric power of said lens so that the image of said distant object is alternatively formed in a first image plane and in a second different image plane;

an infrared detector means substantially on the optical axis of said lens and on the side of said lens remote from said distant object;

said detector means being effectively positioned in one of said image planes so as alternately to receive an in-focus and out-of-focus image of said distant object upon the cyclical variation of said effective dioptric power of said lens;

said detector being of such size, and said lens and said cyclically varying means having such optical properties and being so positioned relative to each other and said detector that said detector receives the entire in-focus image of a distant object of the type intended to be detected for object positions substantially on said optical axis;

electric circuit means operatively connected to said detector means for producing an output signal if the intensity of the total radiation reaching said detector when it receives said in-focus image differs by a substantial amount from the intensity of the total radiation reaching said detector when it receives said out-of-focus image;

and an indicator means connected to said electric circuit means for producing a sensorily perceptible signal when said electric circuit produces an output signal;

said sensorily perceptible signal therefore being produced when said distant object emits infrared radiation of a substantially different intensity level from the infrared radiation emission level of the vicinity of said object.

References Cited by the Examiner
UNITED STATES PATENTS

| | | | |
|---|---|---|---|
| 2,269,713 | 1/1942 | Erwin | 88—65 |
| 2,699,834 | 1/1955 | O'Brien | 88—1 |
| 2,838,600 | 6/1958 | Salinger | 250—233 |
| 2,874,298 | 2/1959 | Kindred | 250—43.5 |
| 2,942,118 | 6/1960 | Gedance | 250—203 |
| 2,963,910 | 12/1960 | Astheimer | 73—355 |

RALPH G. NILSON, *Primary Examiner.*

FREDERICK M. STRADER, MAYNARD R. WILBUR, CHESTER L. JUSTUS, *Examiners.*